Nov. 15, 1927.
W. P. WOOD
1,649,637
BICYCLE LAMP
Filed Dec. 24, 1926
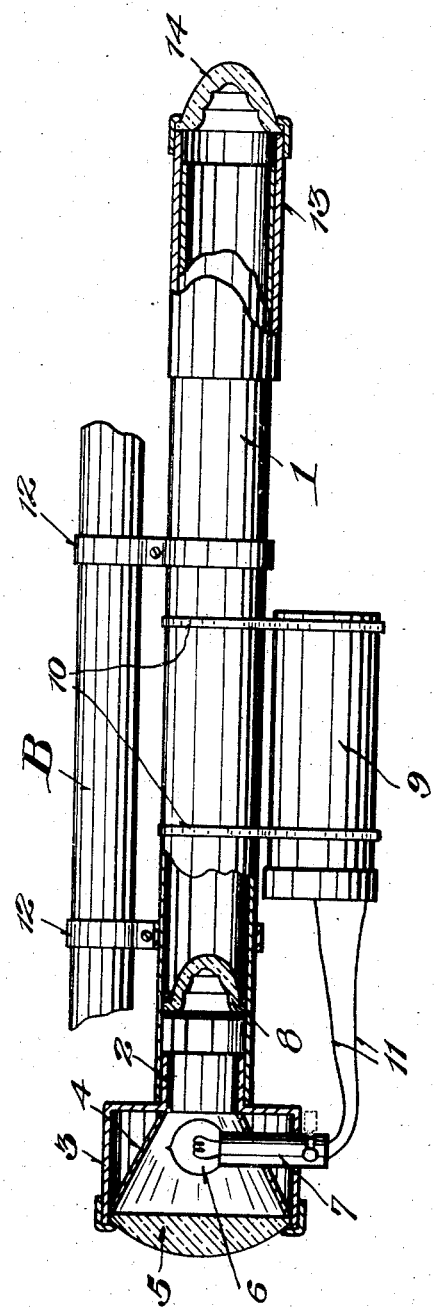
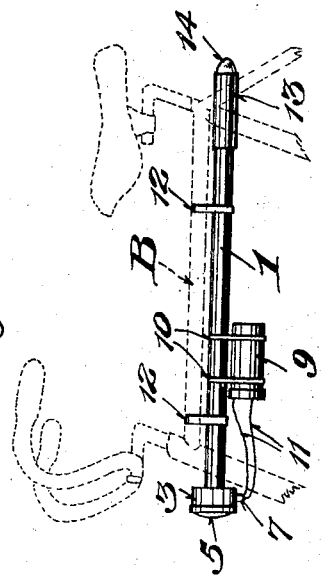
William P. Wood
INVENTOR
BY Joseph A. Miller
ATTORNEY Patented Nov. 15, 1927.

1,649,637

UNITED STATES PATENT OFFICE.

WILLIAM P. WOOD, OF PAWTUCKET, RHODE ISLAND.

BICYCLE LAMP.

Application filed December 24, 1926. Serial No. 156,887.

This invention relates to certain new and useful improvements in bicycle lamps, and the primary object thereof is to provide a lamp which displays a white light at front and a red light at the rear of the bicycle, both of which lights are derived from a single source.

A further object of the invention is to provide a structure of this type which can be operated with a minimum of current, thereby to permit the use of but a single and small battery.

Still further, the invention aims to provide a device of this type which permits of adjustment for the purpose of giving clear vision of the tail light.

The invention also aims to provide a device of this type which is of simple and compact construction and which can be easily applied to the usual horizontal bar of the frame of the bicycle.

In the drawings:—

Fig. 1 is a side elevation of the invention applied to a bicycle, the latter shown in fragment in dotted lines, and Figure 2 is a like view of the invention on an enlarged scale, parts being broken away and in section.

In proceeding in accordance with the present invention, a tube 1 is employed which at its forward end receives the neck 2 of a lamp casing 3, the latter being equipped with a reflector 4 and a clear or white lens 5. An electric lamp 6 has a socket 7 carried by the casing 3, the socket projecting without the casing as shown in Fig. 2. A focusing lens 8 is mounted in the tube 1 to the rear of the electric lamp 6 and is in alignment with the latter. Battery 9 is supported by clips 10 from the tube 1 and is preferably disposed beneath the latter, and has wires 11 leading therefrom and connected to the electric lamp. Clips 12 are secured to the tubular casing 1 and are engaged with the horizontal bar B of the bicycle frame. A tube or sleeve 13 is telescopically and adjustably engaged with the rear end of the tubular member 1 and has a red lens 14 secured thereto.

As apparent from Fig. 1 of the drawings, the device is connected to the bicycle frame so that the clear lens 5 is disposed at the front of the frame, while the red lens 14 is disposed at the rear of the frame. Light rays from the lamp 6 will pass through the lens 5 and through the lens 8, and from the latter will pass through the red lens 14. It will thus be seen that the one electric lamp illuminates both the lenses, and due to the presence of the lens 8, effects illumination of the lens 14, even though the latter is remote from the source of the light.

It will also be seen that by adjusting the sleeve carrying the red lens, the latter can be moved so as to dispose same at the desired distance so as to obtain full illumination thereof.

Having thus described my invention what I claim as new and desire to secure by Letters Patent is—

1. In a bicycle lamp, a tubular member, means to support said member from the horizontal bar of a bicycle, a lamp casing secured to the front of the member, an electric lamp in the casing, a clear lens carried by the casing and disposed at the front of the bicycle frame, a focusing lens in the member to the rear of the lamp, a telescopic sleeve adjustable on the rear of the member, a red lens carried by the sleeve and arranged to be disposed at the rear of the bicycle frame, a battery for the lamp, and means to support the battery from the tubular member.

2. In a bicycle lamp, a tubular member having a clear lens at its front end and a red lens at its rear, said member being of a length so as to dispose the clear lens at the front of the bicycle and the red lens at the rear of the latter, a source of light in the member and means whereby to effect adjustment of the distance between the two lenses.

3. In a bicycle lamp, a tubular member having a clear lens at its front end and a red lens at its rear, said member being of a length so as to dispose the clear lens at the front of the bicycle and the red lens at the rear of the latter, a single source of light disposed rearwardly of and adjacent to the clear lens, and focusing means between the source of light and the red lens to illuminate the latter.

4. In a bicycle lamp, a tubular member having a clear lens at its front end and a red lens at its rear, said member being of a length so as to dispose the clear lens at the front of the bicycle and the red lens at the rear of the latter, a source of light in the member, and means to adjust the red lens longitudinally of the member.

5. In a bicycle lamp, a tubular member having a clear lens at its front end and a red lens at its rear, an electric lamp to the rear of the clear lens, means to the rear of the electric lamp to transmit light rays from the electric lamp to the red lens, a battery, means to connect the battery to the tubular member, current supplying connections between the battery and the electric lamp, and means to connect the tubular member to a bicycle.

6. In a lamp, a tubular member having a red lens at its rear, a lamp casing having a clear lens secured to the front of the member, an electric lamp disposed transversely of the lamp casing and having the outer end of its socket projecting without the casing, a battery, means to connect the battery to the tubular member, and current supplying connections between the battery and said outer end of the lamp socket.

7. In a lamp, a tubular member, a lamp casing secured to the front of the tubular member and having a clear lens therein, an electric lamp in the casing, a focusing lens in the tubular member to the rear of the lamp, a battery, means to connect the battery to the tubular member, current supplying connections between the lamp and the battery, a red lens, and means to adjustably mount the red lens at the rear of the tubular member so as to enable the distance between the clear and red lenses to be adjusted.

In testimony whereof I have signed my name to this specification.

WILLIAM P. WOOD.